United States Patent Office 3,573,030
Patented Mar. 30, 1971

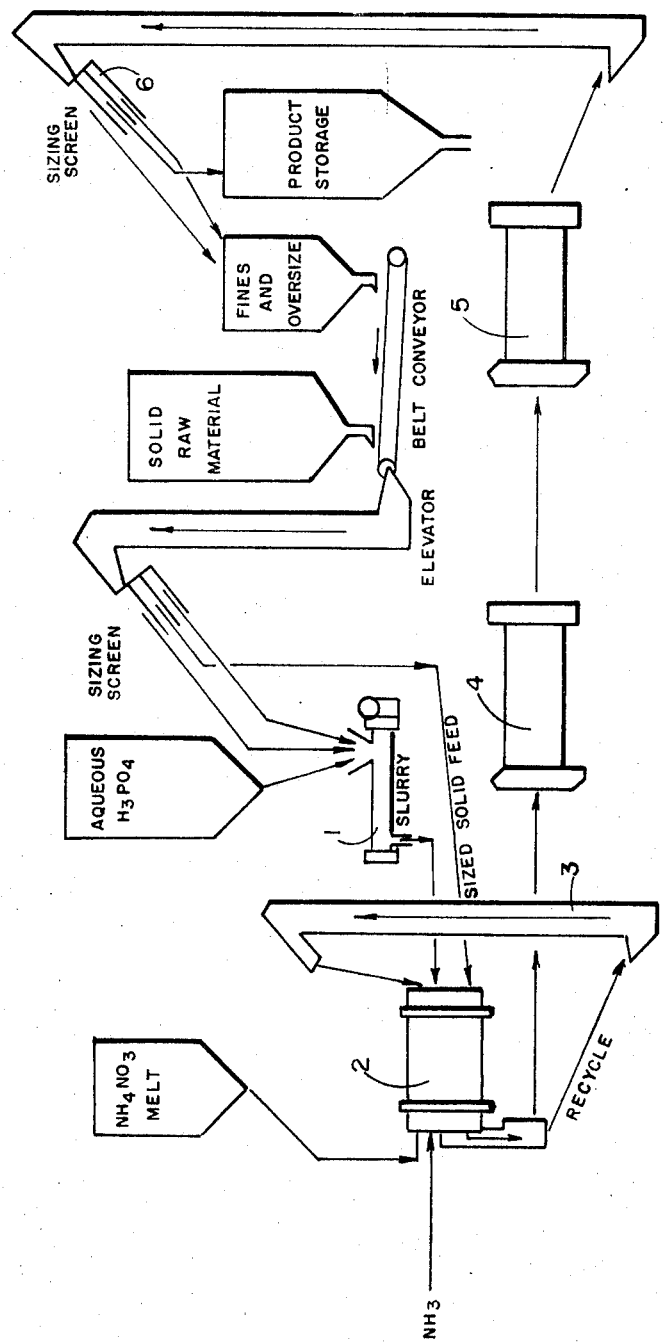

3,573,030
PROCESS FOR MIXED FERTILIZER GRANULATION
Wilbur A. McPherson, Baxter Springs, Kans., and Robert W. Hamilton, Joplin, Mo., assignors to Gulf Oil Corporation, Pittsburgh, Pa.
Filed May 7, 1968, Ser. No. 727,238
Int. Cl. C05b 19/00
U.S. Cl. 71—64                2 Claims

ABSTRACT OF THE DISCLOSURE

In a practically dust-free process for manufacturing substantially spherical fertilizer granules the feed streams to the granulator consist of solids of controlled particle size, molten ammonium nitrate, ammonia, a slurry produced by wet-grinding oversize solids and fines in aqueous phosphoric acid, and granular product recycled directly from the granulator exit.

DESCRIPTION OF THE INVENTION

Granular mixed fertilizers are commonly manufactured by "balling up" moistened finely divided solids in a revolving drum or granulator, in which the solids are maintained as a free-flowing rolling bed.

Customarily, granulating processes present some problems with respect to occasional aggregation of moist solids into large chunks and formation of granules of such irregular shape that they are unattractive and do not roll in the rolling bed. These problems usually receive all of the attention while the fact that the process fills the air with dust is virtually ignored. The entire fertilizer industry has neglected this air pollution problem in the past, mainly because fertilizer dust is relatively noninjurious to adjacent property and produces no fire or explosion hazards. However, with increasing population density and growth of size of fertilizer plants, the dust around these plants has become a nuisance that cannot be ignored.

Dust is produced in fertilizer manufacture mainly by dry-grinding of solids as in recycling oversize and fines, and in attrition of granules during drying, cooling and handling. Attrition losses to a great extent result from prolonged drying operations necessitated by use of large amounts of water in the process and by production of granules which are rough, rather than round and smooth. To some extent attrition loss results also from uneven distribution of moisture in the granulator, so that some of the granules are soft and break apart in handling.

By the procedure of this invention substantially spherical granules are produced by a combination of steps which minimize dust production. The small amounts of dust present in ventilator exhaust streams from the granulator, dryer and cooler are readily removed by liquid scrubbing, so that the air pollution problem is effectively eliminated. The process comprises the following steps:

(a) Comminuting a mixture of aqueous phosphoric acid and fertilizer solids to yield a slurry, (b) Feeding into a revolving granulating apparatus the slurry produced in step (a) and fertilizer solids of controlled particle size to yield a rolling bed of solid particles, coated with the slurry of step (a), (c) Feeding into the same revolving granulating apparatus a stream of hot liquid ammonium nitrate, (d) Reacting ammonia with the contents of the rolling bed of solid particles in the revolving granulating apparatus, (e) Removing hot, moist substantially spherical granular product from the revolving granulating apparatus, (f) Recycling to the revolving granulating apparatus from about ½ to ¾ of the hot moist granular product, (g) Drying and cooling the remainder of the granular product, (h) Screening the dry, cool granular product to remove fines and oversize particles therefrom and (i) Employing said fines and oversize particles as fertilizer solids in step (a).

The process is explained in detail in the discussion which follows and by reference to the drawing.

Step (a)

In this step it is preferred to use commercial wet process phosphoric acid or more dilute acid and to use a comminuting apparatus (No. 1 in the drawing) which reduces particle size by cutting or chopping. The use of milling apparatus in which there are high shearing or frictional forces will produce satisfactory slurry but increases the power requirements of the process unnecessarily. A preferred type of apparatus for slurry production employs a hoizontal shaft having cutting blades attached thereto, which is rotated at a speed below about 10,000 r.p.m. At high rotational speeds, centrifugal force thickens the slurry near the periphery of the rotating member, increasing shearing forces and consequently the power consumed. By use of a variable speed drive, adjustment within a satisfactory speed range may be done by an operator of ordinary skill. The texture of a typical slurry resembles that of soft ice cream or a milkshake. The particle size need not be small enough for the slurry to have the glossy surface texture of a clay slip.

Step (b)

In the granulator (No. 2 in the drawing), solid particles of a narrow range of sizes are employed as nuclei and are coated with slurry. The rolling of the solid particles during the coating tends to cause them to become round in shape, although the original solid feed may have consisted to a substantial extent of sharp-edged crystals.

Step (c)

Although nitric acid might have been included in the slurry and a substantial portion of the ammonium nitrate formed in the granulator, this has been found to be undesirable unless there is a need for more liquid in the slurry. The present method gives rounder particles, eliminates a corrosion problem, prevents formation of a deposit on the walls of the granulator and increases the speed of granulation. Hot ammonium nitrate liquor of about 5% water content is preferred in this step. This liquid quickly coats the particles in the moving bed without causing agglomeration.

Step (d)

Ammoniation is preferably carried out by sparging liquid ammonia into a turbulent zone of the rolling bed of particles. The ammonia is quickly vaporized and then taken up by the acid content of the moist particles. The heat of reaction leads to vaporization of water from the particles and this vapor is preferably removed by forced air ventilation. The solid particles are sufficiently moist, however, so that the vented air stream is substantially dust-free.

Steps (e), (f) and (g)

The substantially spherical granular product should be removed from the granulator and recycled at a high rate in order to promote longitudinal movement of the rolling bed through the granulator. In this way the particles are kept rolling in two directions, which appears to improve roundness. Recycle may be conveniently accomplished by means of an elevator (No. 3 in the drawing).

Preferably, a rough separation based on particle size is used to separate the material from the product stream for recycling to the granulator, so that on the average, recycled material will be slightly undersized.

By recycling without cooling crystallization of ammonium nitrate is retarded and production of fines by attrition is substantially reduced. Heat is conserved and evaporation of moisture in the granulator is promoted. Air is blown on the bed preferably downstream from the ammonia sparger, bringing about rapid solidification of the ammonium nitrate and hardening of particles as they approach the exit of the granulator.

With increasing amounts of water in the feed stream there is a tendency to produce particles which are less resistant to attrition unless the recycle rate is increased, so as to distribute the moisture over a greater amount of material. It is preferable to keep the water content at a minimum, since the cost of operating the dryer is directly related to water content of the product.

The portion of the product which is not recycled is dried and cooled, the gas fired dryer (No. 4 in the drawing) being operated typically at a throat temperature of about 150° C. The residence time in dryer and cooler (No. 5 in the drawing) should be kept at a minimum, since attrition losses occur mainly in handling dry product. Dust content of the vented air streams from the dryer and cooler is ordinarily low and is easily removed by means of a scrubber.

Steps (h) and (i)

The process normally produces very little fines and oversize, especially if high recycle rates are maintained. However, screening is desirable so as to maintain the uniformity of product appearance. This is accomplished with the use of a sizing screen (No. 6 in the drawing).

In the examples below are illustrated the manufacture of a variety of fertilizer products by means of the process of this invention.

Example 1.—In this example a fertilizer was manufactured with a N—$P_2O_5$—$K_2O$ equivalent analysis of 24–10–10. For each ton of fertilizer ingredients fed to the process, the proportions used were as follows:

|  | Pounds |
|---|---|
| Ammonia | 73 |
| Wet process phosphoric acid (54% $P_2O_5$) | 370 |
| Potassium chloride (fine) (60% $K_2O$) | 334 |
| Ammonium nitrate melt (5% $H_2O$) | 1260 |

Dry feed to the granulator was screened to a particle size between 6 and 16 mesh (U.S. Series), with fines and oversize going to the manufacture of slurry in the comminuting apparatus.

Recycle rate was varied to from ½ to ¾ of the product from the granulator. Better product appearance was obtained at the higher recycle rate. The amount of internal recycle will not limit the throughput rate until it reaches a point at which the granulator or elevator will not handle the flow.

Dry product was sized by screening to between about 8 and 14 mesh. A lower production of fines and oversize was observed at higher recycle rates.

Example 2.—In this example a fertilizer was manufactured with a nutrient equivalent analysis of 17–17–17. Ingredients were fed into the process continuously in the following proportions:

|  | Pounds |
|---|---|
| Ammonia | 124 |
| Wet process phosphoric acid (54% $P_2O_5$) | 630 |
| Potassium chloride (fine) (60% $K_2O$) | 568 |
| Ammonium nitrate melt (5% $H_2O$) | 715 |

Essentially the same conditions were maintained as in Example 1. Constant size of product from the granulator was maintained by controlling the proportion of sized solids (nuclei) fed to the granulator, the remainder going to slurry manufacture. Moisture content and roundness of particles in the granulator were controlled by adjusting recycle rate.

Example 3.—In this example a fertilizer was manufactured with a nutrient equivalent analysis of 25–25–0.

The process was started by filling the granulator bed and recycle stream with a granulated fertilizer of uniform particle size having a nutrient equivalent analysis of 18–46–0 and feeding some of the same material to slurry production. As the fertilizer began to come out of the cooler, it was screened to a narrow, uniform particle size to provide fines and oversize for slurry production. Eventually the start-up material was replaced by granules which formed in the granulator by interaction of recycled granules, slurry, ammonium nitrate melt and ammonia. Once steady conditions were achieved, fines and oversize screened from the product were sufficient in quantity to provide the feed for slurry production. For each ton of raw materials the proportions of the feed streams were as follows:

|  | Pounds |
|---|---|
| Ammonia | 225 |
| Wet process phosphoric acid (54% $P_2O_5$) | 925 |
| Ammonium nitrate melt (5% $H_2O$) | 950 |

This example illustrates an embodiment in which the fertilizer solids of step (b) consist entirely of recycled material. Control of particle size appears to be effected by the high recycle rate, which causes small particles to increase in size preferentially while larger particles swiftly pass out of the granulator along the sloping upper surface of the rolling bed.

We claim:
1. The process for manufacturing a granular fertilizer, comprising the steps:
   (a) comminuting a mixture of aqueous phosphoric acid and fertilizer solids to yield a slurry,
   (b) feeding into a revolving granulating apparatus the slurry produced in step (a) and fertilizer solids of controlled particle size to yield a rolling bed of solid particles, coated with the slurry of step (a),
   (c) feeding into the same revolving granulating apparatus a stream of hot liquid ammonium nitrate,
   (d) reacting ammonia with the contents of the rolling bed of solid particles in the revolving granulating apparatus,
   (e) removing hot, moist substantially spherical granular product from the revolving granulating apparatus,
   (f) recycling to the revolving granulating apparatus from about ½ to ¾ of the hot moist granular product,
   (g) drying and cooling the remainder of the granular product,
   (h) screening the dry, cool granular product to remove fines and oversize particles therefrom and
   (i) employing said fines and oversize particles as fertilizer solids in step (a).

2. The process for manufacturing a granular fertilizer, comprising the steps:
   (a) comminuting a mixture of aqueous phosphoric acid and fertilizer solids consisting essentially of potassium chloride, ammonium nitrate and recycled fertilizer solids to yield a slurry,
   (b) feeding into a revolving granulating apparatus the slurry produced in step (a) and solid particles of fertilizer of a screened size between 6 and 16 mesh (U. S. Series) to yield a rolling bed of solid particles coated with the slurry of step (a),
   (c) feeding into the same revolving granulating apparatus a stream of hot liquid ammonium nitrate,
   (d) reacting ammonia with the contents of the rolling bed of solid particles in the revolving granulating apparatus,
   (e) removing hot, moist, substantially spherical granular product from the revolving granulating apparatus,
   (f) recycling to the revolving granulating apparatus from about ½ to ¾ of the hot, moist granular product, the recycled granules being separated from the product stream on the basis of particle size so that they are on the average of smaller size than the remainder of the granular product, (g) drying and cooling the remainder of the granular product, (h) screening the dry, cool granular product to remove fines and oversize particles therefrom, yielding a substantially spherical granular product of controlled particle size, and (i) employing said fines and oversize particles separated in step (h) as recycled fertilizer solids in step (a).

References Cited

UNITED STATES PATENTS

| | | | |
|---|---|---|---|
| 2,770,539 | 11/1956 | Martenet | 71—64X |
| 3,306,729 | 2/1967 | McPherson et al. | 71—64X |
| 3,436,205 | 4/1969 | Davis | 71—64X |

JAMES L. DECESARE, Primary Examiner